United States Patent [19]

Haney et al.

[11] Patent Number: 4,652,475
[45] Date of Patent: Mar. 24, 1987

[54] COMPOUND ADHESIVE FORMULATION AND COMPOSITE HOSE MADE WITH THE SAME

[75] Inventors: Joe C. Haney, Aurora; Albert M. Sotelo, Littleton, both of Colo.

[73] Assignee: The Gates Rubber Company, Denver, Colo.

[21] Appl. No.: 796,138

[22] Filed: Nov. 8, 1985

[51] Int. Cl.$^4$ ............................................. F16L 9/14
[52] U.S. Cl. .................................. 428/36; 428/246; 138/137; 138/141; 138/174
[58] Field of Search ................... 138/141, 137, 174; 428/36, 246

[56] References Cited

U.S. PATENT DOCUMENTS

| | | | |
|---|---|---|---|
| 3,024,813 | 3/1962 | Sear | 138/141 |
| 3,816,361 | 6/1974 | Morital | 428/393 |
| 3,944,453 | 3/1976 | Crudgar et al. | 138/141 |
| 3,951,887 | 4/1976 | Tanimural et al. | 428/502 |
| 4,035,534 | 7/1977 | Nyberg | 138/141 |
| 4,209,042 | 6/1980 | Buan | 138/141 |
| 4,330,017 | 5/1982 | Satoh et al. | 138/141 |
| 4,338,970 | 7/1982 | Krackeler | 138/141 |
| 4,421,810 | 12/1983 | Rasmussen | 428/36 |
| 4,474,217 | 10/1984 | DeMarse et al. | 138/141 |

Primary Examiner—John E. Kittle
Assistant Examiner—James J. Seidleck
Attorney, Agent, or Firm—C. H. Castleman, Jr.; H. W. Oberg, Jr.; F. P. Grassler

[57] ABSTRACT

A precompounded formulation that acts as an adhesive layer when subjected to heat and pressure in contact with thermoplastics such as polyethylene or polyvinyl chloride and elastomeric materials such as EPDM or chlorobutyl rubber. The formulation incorporates a formaldehyde donor/acceptor system such as resorcinol and hexamethoxymethylmelamine. The formulation is further comprised of a blend of thermoplastic materials, the composition of which varies depending upon the type of material that the bonding layer is required to adhere to. The formulation will also adhere to thermoplastic elastomers (TPE) making it feasible to manufacture a hose article with elastomeric and thermoplastic layers bonded together by the formulation without the need to vulcanize the article. Heretofore, thermoplastic elastomers were thought to be incapable of adhering to dissimilar materials without the application of a tackifier or an adhesive or glue-like material. The formulation eliminates the need to apply sticky resins and the like in order to bond a thermoplastic and an elastomeric layer together for the manufacture of a composite hose article.

16 Claims, 2 Drawing Figures

COMPOUND ADHESIVE FORMULATION AND COMPOSITE HOSE MADE WITH THE SAME

The invention relates to several precompounded thermoplastic/elastomeric formulations incorporating a formaldehyde donor/acceptor system that bonds effectively to thermoplastic and elastomeric materials. The invention further relates to hose articles that are made incorporating the claimed formulation. The formulation can effect a bond to various types of thermoplastic and elastomeric materials. Significantly, a specific formulation can simultaneously effect a bond between a thermoplastic material and a thermoplastic elastomer, making it feasible to manufacture a hose article without vulcanization.

The prior art discloses the use of a formaldehyde donor/acceptor system to effect a bond between rubber and reinforcing materials. U.S. Pat. No. 3,951,887 to Tanimura et al discloses the formaldehyde donor/acceptor system being mixed via a Banbury mixer into a vulcanizable rubber composition. This composition then adheres to reinforcing materials such as nylon cord simultaneously with vulcanization. U.S. Pat. No. 3,816,361 to Morita discloses a formaldehyde donor and a saturated polymer incorporated into the rubber for enhanced rubber to fiber adhesion upon vulcanization. To applicant's knowledge, there has been no formulation developed that will adhere to thermoplastic and elastomeric materials with the application of heat and pressure.

It is the primary object of this invention to provide a compounded formulation incorporating a formaldehyde donor/acceptor system that effectively bonds to thermoplastics and elastomeric materials when in contact with those materials upon the application of sufficient heat to soften the thermoplastic material and pressure in excess of ambient. The invention further provides for the manufacture of a hose using this precompounded formulation as an adhesive layer between thermoplastic and elastomeric layers.

A further object of this invention is to provide a compounded formulation incorporating a formaldehyde donor/acceptor system that effectively bonds to chlorinated thermoplastics and thermoplastic elastomers in the manufacture of hose without the need to vulcanize the hose article.

The hose manufactured using this formulation has particularly attractive applications in the food handling industry where thermoplastic tubes are desireable because of their nonporous nature, thereby minimizing the growth of bacteria, and the fact that they impart minimal taste to the fluid conveyed through them compared to more conventional rubber materials. Other applications for hose incorporating the formulation for bonding a layer of thermoplastic material to a layer of elastomeric material include: petroleum products, acid chemicals, abrasive slurries, air, and water.

SUMMARY OF THE INVENTION

In one aspect, the invention is directed to a compounded formulation incorporating a polymethylmelamine such as hexamethoxymethylmelamine as a formaldehyde donor, and an m-disubstituted benzene such as resorcinol as a formaldehyde acceptor. This system promotes bonding between a thermoplastic layer formed for instance of polyethylene, polyvinylchloride, or chlorinated polyethylene and an elastomeric material when exposed to heat and pressure while in contact with these materials.

In an alternate formulation, when chlorinated thermoplastic is used in conjunction with a melt processable rubber, the compounded formulation will effect a bond between these two materials without vulcanization. The chlorinated thermoplastics are used because of their high polarity, which facilitates bonding with the formulation. The increased polarity of the adhesive layer causes an ionic attraction between the adhesive layer and the layer made of polar thermoplastic elastomer.

In a further aspect, the invention is drawn to composite hose articles incorporating the compounded formulation and an adhesive layer to facilitate bonding between thermoplastic and elastomeric material. In one application the invention is drawn to the composite hose article including (1) a first annular member composed of a polyolefin or chlorinated polyolefin such as polyethylene, polyvinylchloride, or chlorinated polyethylene, (2) a second annular member made of an elastomeric material not readily bondable to the thermoplastic material in the first annular member, (3) a reinforcement such as tire cord or square woven fabric embedded in the elastomeric material of the second annular member or, alternatively, a textile braid, spiral or knit reinforcement material interposed between the first and second annular members with sufficient interstices so that there is significant surface contact between the first and second annular members, and (4) an interlayer of heat setting, compounded adhesive polymeric formulation; e.g., of the type described in the preceding paragraphs, interposed between and bonded to both the inner thermoplastic tube and the elastomeric layer.

In another application, the invention is drawn to a composite hose article including (1) first annular member composed of a chlorinated thermoplastic, (2) a second annular member composed of a thermoplastic elastomer, (3) a reinforcement material such as square woven fabric or tire cord embedded in the thermoplastic elastomer of the second annular member, or, alternatively, a textile braid, spiral or knit reinforcement material interposed between the first and second annular members with sufficient interstices so that there is significant surface contact between the first and second annular members, (4) an interlayer of heat setting, compounded adhesive polymeric formulation, again of the type described in the first paragraph, interposed between and bonded to both the inner chlorinated thermoplastic tube and the elastomeric reinforcement layer. A further application uses the formulation as a cover member encompassing an elastomeric tube with the reinforcement, either embedded in elastomeric material or a textile braid, spiral, or knit, sandwiched therebetween. A rib of PVC is then spiralled atop the cover and, upon the application of heat and pressure, the formulation layer bonds to both the elastomeric reinforcement layer and the PVC spiral rib, resulting in a fairly rigid, vacuum resistant hose. The rib also protects the cover of the hose.

In yet another aspect, the invention pertains to methods for making the composite hose. One method includes the steps of: (1) wrapping the thermoplastic material made of a polyolefin such as polyethylene, polyvinylchloride, or chlorinated polyethylene around a nonlubricated mandrel, (2) wrapping the precompounded polymeric adhesive gum incorporating the formaldehyde donor/acceptor system about the thermoplastic layer, (3) wrapping a reinforcement layer consisting of an elastomeric material skimmed about a reinforcement material such as tire cord or square woven fabric about the tube so that the adhesive layer of polymeric adhesive formulation is interposed between the tube and the reinforcement layer, (4) wrapping a nylon layer about the cover, and (5) vulcanizing the thus formed article to produce a composite unitary hose. The heat of the vulcanization causing the thermoplastic material to soften and the nylon wrap to shrink, resulting in intimate contact between the adjacent layers of the hose, through which bonding is promoted.

Alternately the hose can be made by: (1) extruding the thermoplastic tube, (2) coextruding the precompounded polymeric adhesive gum incorporating the formaldehyde donor/acceptor system about the thermoplastic tube, (3) applying a reinforcement layer such as tire cord embedded in an elastomeric material or knit, spiral, or braid fabric about the adhesive gum layer, (4) applying a layer of elastomeric material atop the reinforcement layer. It should be noted that the heat and pressure necessary for the adhesive gum layer to adhere to the adjacent layer must come from the extrusion process in the extruded embodiment. Otherwise, the formed hose must be placed in a lead press to impart sufficient heat and pressure for the various layers to adhere properly. The threshold temperature required for proper adhesion depends on the thermoplastic used, for the softening point of the plastic in the article of manufacture is the minimum temperature necessary. The applied pressure must be in excess of ambient.

The hose articles of the invention encompasses various types of reinforced hoses for various services including food handling applications such as wine and beverage transport, as well as other applications where low porosity of the tube and no importation of taste to the products transported are desireable properties.

BRIEF DESCRIPTION OF THE DRAWINGS

The invention will be more particularly set forth in certain illustrated embodiments by reference to the accompanying drawings in which.

PREFERRED EMBODIMENTS OF THE INVENTION

Figure 1:
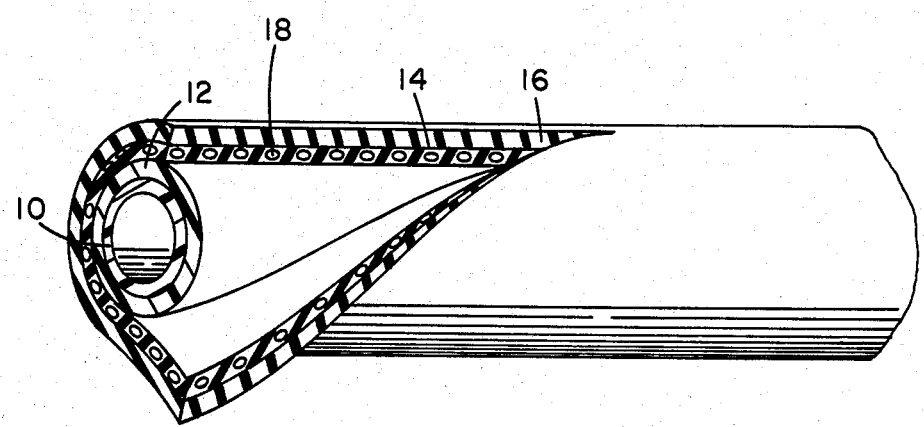
FIG. 1 is a cutaway section of a hose embodying the invention with the embedded reinforcement layer.

A food and beverage hose made in accordance with the invention is shown in FIG. 1. The outer surface of the hose is composed of a Neoprene or EPDM cover 16. Layer 14 is composed of an elastomeric material in which is embedded a reinforcement material such as square woven fabric or tire cord. The adhesive gum layer 12 is interposed between the fabric reinforcement layer 14 and the inner tube member 10, and it is directly bonded to the inner tube along their mutual interface. In turn, the adhesive gum layer 12 is directly bonded to the elastomeric layer 14. The tube 10 is made of a polyolefin or chlorinated polyolefin thermoplastic material such as polyethylene, polyvinylchloride, or chlorinated polyethylene. The elastomeric layer 14 may consist of a thermoplastic elastomer (TPE) such as Alcryn ®, a registered trademark of the E.I. Du Pont de Nemours Corporation or Santoprene ®, a registered trademark of Monsanto, Inc. The TPE is skimmed about a reinforcing fabric consisting of either square woven fabric or tire cord. When the cover 14 consists of TPE skimmed about the reinforcement fabric then the tube 10 is made of a chlorinated thermoplastic material. The embodiment incorporating a polyvinylchloride tube is preferred because the hose does not begin to break down until exposed to temperatures in excess of 180° F. The polyethylene tube will begin to break down when exposed to temperatures in excess of 150° F.

Figure 2:
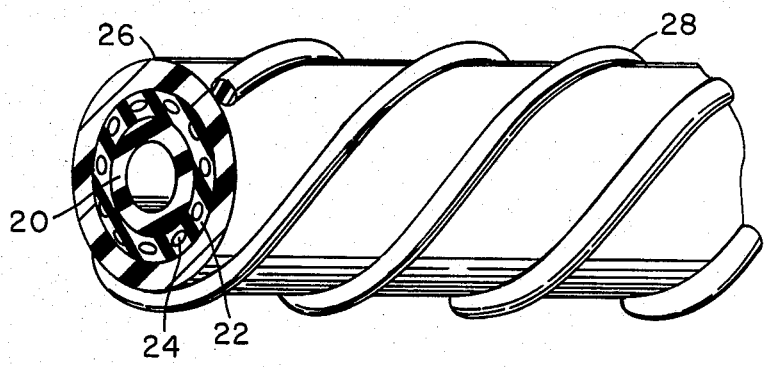
FIG. 2 is a section of hose with the formulation used as a cover.

In an alternate construction (FIG. 2), the tube 20 is composed of an elastomeric material such as nitrile or Neoprene. A reinforcement layer 22 consisting of a square woven fabric or tire cord is embedded in an elastomeric material. An alternate embodiment (not shown) has a knitted, braided, or spiralled textile reinforcement layer applied about the tube with an elastomeric layer skimmed or otherwise applied atop the reinforcement layer. The adhesive formulation 26 is then wrapped about the reinforcement layer and a rib of PVC 28 is then spiralled atop the layer of precompounded formulation. A layer of nylon shrink tape is then wrapped about the hose and as heat is applied, the tape shrinks, forcing the underlayers into intimate contact, resulting in the adhesion of the formulation to the adjacent layers. The PVC rib 28 gives the hose rigidity so that it is vacuum resistant, and also protects the hose when dragged across a surface.

Generally, the system that facilitates the bonding between the thermoplastic and the elastomeric materials is a formaldehyde donor/acceptor system. This system in essence forms a chemical bridge between adjacent layers. Generally, the formaldehyde donor can consist of amine formaldehyde resin and the amine acceptor would be an m-disubstituted benzene. More specifically, in the formulations illustrated below, hexamethoxymethylmelamine was selected as the formaldehyde donor because it will react with the formaldehyde acceptor in the temperature range of 50° to 150° F, which means that the reaction will occur at a temperature that is less than the melting point of the polyethylene.

Specific formulations of the adhesive layer used to manufacture the hoses described above are found below together with a description of the method of producing the hoses. It will be understood that the examples are only illustrations of the invention as disclosed, and are not in any way intended to limit the invention to the examples discussed.

EXAMPLE 1

A compounded thermoplastic formulation in which the following ingredients are specified in the following proportions in parts by weight:

TABLE 1

| | |
|---|---|
| Polyethylene | 46.97 |
| Ethylene Propylene Diene Polymer (EPDM) | 29.92 |
| Polyvinylchloride - Vinyl Acetate Copolymer | 22.73 |
| Silica (HiSil 233 ®) | 16.00 |
| Diisononyl Phthalate | 10.00 |
| Paraffin Wax | 1.00 |
| Hexamethoxymethylmelamine (formaldehyde donor) | 4.58 |
| Resorcinol Formaldehyde Resin (formaldehyde acceptor) | 3.58 |
| Cadmium/Zinc Stabilizer | .50 |
| Total | 135.28 |

The above formulation is fluxed in a Banbury mixer at 300° F. The diisononyl phthalate, which is used as a plasticizer, and the paraffin wax, are used to optimize the processability of the formulation. No vulcanizing agents, like sulfur, are necessary to adhere the formulation to the adjacent layers. Similarly, the EPDM is also added to enhance the flexibility of this thermoplastic formulation. The hexamethoxymethylmelamine is used as the formaldehyde donor because it will not flash off at temperatures in excess of 300° F.

After the formulation has been mixed, it is calendered in sheets with a thickness of approximately 0.010 inches. The calendered formulation will bond to a variety of thermoplastics including polyethylene when in contact with them upon the application of heat and pressure. When used in the building of hose, the formulation is wrapped about a tube consisting of one of the above mentioned thermoplastic materials. A gum fabric, consisting of a reinforcement material such as square woven fabric or tire cord embedded between two layers of an elastomeric material is then wrapped about the calendered formulation. A layer of elastomeric material is then wrapped about the hose article. Finally, a nylon shrink tape is wrapped about the article so that pressure is exerted on the hose article as heat is applied.

Since the hose consists of two layers of elastomeric material, it must be vulcanized. In this example, the hose is vulcanized using 35 p.s.i.g. steam at 290° F. for 90 minutes. The hose is then removed from the mandrel. The heat from vulcanization, plus the pressure from the nylon shrink tape wrapped about the hose is sufficient to bond the formulation layer to the layers adjacent to it. There is no need to lubricate the mandrel when building the hose because the thermoplastic material used for the tube is sufficiently smooth to slip off the mandrel easily. A hose using the above formulation as an adhesive layer has been tested and the adhesion between the tube and the adhesive layer was found to be 41 pounds per inch. The adhesion between the adhesive layer and the cover was found to be 37 pounds per inch. All measurements were taken using ASTM method D-2084. The burst pressure of the hose was found to be 642 p.s.i.g.

Though polyethylene was initially the preferred tube material, tests have shown that it begins to soften at 150° F. In the food handling industry, hoses are cleaned using cleaning solutions at temperatures of up to 180° F. Therefore, polyvinylchloride, which has a softening temperature in excess of 180° F., is a preferred material for this application.

EXAMPLE 2

A compounded thermoplastic formulation in which the following ingredients are combined in parts by weight:

TABLE 2

| | |
|---|---|
| Polyvinyl Chloride Plastic | 40.00 |
| Acrylonitrile Butadiene Copolymer | 29.92 |
| Polyvinyl Chloride - Vinyl Acetate Copolymer | 30.00 |
| Silica (Hi Sil 233 ®) | 12.00 |
| Polyester Plasticizer | 10.00 |
| Iron Oxide | 1.00 |
| Paraffin Wax | 1.00 |
| Hexamethoxymethylmelamine (formaldehyde donor) | 4.60 |
| Resorcinol Formaldehyde Resin (formaldehyde acceptor) | 3.90 |
| Calcium and/or Barium Stabilizer | .50 |
| Total | 132.92 |

The above formulation is compounded in the same way as the previous example. The plasticizer, and paraffin wax are added to optimize the processability of the formulation. The iron oxide is used to enhance the color of the hose. Therefore, the quantities of these ingredients can be varied according to the hose properties desired as dictated by the particular application. The fundamental difference between this formulation and the formulation in example 1 is that the polarity of the formulation is greater so the affinity between the adjacent layers and the formulation is also greater. If a thermoplastic elastomeric material is used in the reinforcement and cover layers, no vulcanizing agents, e.g. sulfur, will be needed to promote bonding between the outer layers. Therefore, with the nylon shrink wrap applying pressure as the article is heated, a unitary hose article can be manufactured with layers made of disparate materials without the cross-linking associated with vulcanization. Rather, the polar affinity between the layers effects the bonding.

To optimize the bond between the tube and the adhesive layer chlorinated thermoplastics such as polyvinylchloride were used to make the tube. Acrylonitrile butadiene copolymer also increased the polarity of the compounded formulation. The hose article, after being assembled, was cured for 45 minutes at a temperature of 320° F. The adhesion of the tube to the adhesive layer was 66 pounds per inch. The adhesion of the tube to the cover was 20 pounds per inch. All measurements were taken using ASTM method D-2084.

The nylon material wrapped about the hose as the outermost layer shrinks as the hose is cured. This compresses the layer underneath the nylon layer together, as the materials are softened. The result is a fairly flexible hose article that is able to withstand temperatures of 180° F. The nylon wrap is removed after the hose is cured and is reusable.

It will be understood that the invention is capable of a variety of modifications and variations, which will become apparent to those experienced in the art upon a reading of the specification, the scope of the invention being defined by the appended claims.

What is claimed is:

1. A unitary, polymeric hose article for conveying fluids comprising: a first annular layer; a second annular layer; the first and second annular layers being composed of dissimilar polymers not readily bondable to one another; one of said annular layers being comprised of a thermoplastic material and the other of said annular layers being comprised of an elastomeric material; a reinforcement; and an interlayer of heat setting, compounded adhesive polymeric formulation interposed between and bonded to the first and second annular layers; and compounded formulation comprised of a formaldehyde donor and formaldehyde acceptor system, the formulation having become bonded to the first and second annular layers after application of heat and pressure.

2. The hose of claim 1 wherein the interlayer comprises a blend of thermoplastic and elastomeric materials.

3. The hose of claim 1 wherein the first annular layer is formed of a chlorinated thermoplastic and the second annular layer is formed of a thermoplastic elastomer.

4. A unitary, polymeric hose article for conveying fluids including an inner tube and outer cover, which are composed of dissimilar polymers not readily bondable to one another comprising:
 an inner heat forming thermoplastic tube;
 an outer cover comprised of an elastomeric material;
 a reinforcement layer;
 a precompounded blend of thermoplastic and elastomeric materials that acts as an adhesive layer interposed between the cover and the tube, the precompounded blend further comprising a formaldehyde donor and acceptor system that will bond to adjacent thermoplastic and elastomeric layers upon the application of heat and pressure.

5. The hose of claim 4 wherein the tube is made of a polyolefin.

6. The hose of claim 4 wherein the reinforcement material is square woven fabric, and is embedded in the outer cover.

7. The hose of claim 4 wherein the reinforcement material is tire cord, and is embedded in the outer cover.

8. The hose of claim 4 wherein the reinforcement is a textile braid, spiral, or knit interposed between the tube and cover on either side of the adhesive layer, with sufficient interstices so that there is intimate contact between the layers on either side of the reinforcement.

9. The hose of claim 4 wherein the tube is made of a chlorinated thermoplastic.

10. The hose of claim 4 wherein the elastomeric material in the outer cover is a thermoplastic elastomer.

11. A unitary, polymeric hose article for conveying fluids including an inner tube and an outer cover, which are composed of dissimilar polymers not readily bondable to one another comprising:
an inner elastomeric tube;
a precompounded thermoplastic/elastomeric formulation cover comprising a blend of thermoplastic and elastomeric materials and a formaldehyde donor and acceptor system that will bond to adjacent thermoplastic and elastomeric layers upon the application of heat and pressure;
a reinforcement layer;
an intermediate layer comprised of an elastomeric material interposed between the tube and the cover; and
a chlorinated thermoplastic rod spirally wound onto the cover forming a semi-rigid helical spine.

12. The hose of claim 11 wherein the reinforcement material is tire cord.

13. The hose of claim 11 wherein the reinforcement material, is square woven fabric.

14. The hose of claim 11 wherein the reinforcement is a textile braid, spiral, or knit interposed between the tube and cover on either side of the adhesive layer, with sufficient interstices so that there is intimate contact between the layers on both sides of the reinforcement.

15. A unitary, polymeric hose article for conveying fluids comprising:
a first annular layer formed of a chlorinated thermoplastic material;
a second annular layer comprised of a thermoplastic elastomer material;
said first and second annular layers being not readily bondable to one another;
a reinforcement; and
an interlayer of heat setting, compounded adhesive polymeric formulation interposed between and bonded to the first and second annular layers;
the compounded formulation comprised of a precompounded blend of the thermoplastic and elastomeric materials that has become bonded to the first and second annular layers after application of heat and pressure.

16. The hose article of claim 15 wherein the compounded formulation is further comprised of a formaldehyde donor and a formaldehyde acceptor system.

* * * * *